(12) United States Patent
Collins, Jr.

(10) Patent No.: US 10,322,475 B2
(45) Date of Patent: Jun. 18, 2019

(54) ADJUSTABLE PIPE ROLL AND SUPPORT MECHANISM

(71) Applicant: Sumner Manufacturing Co., Inc., Houston, TX (US)

(72) Inventor: Robert H. Collins, Jr., Houston, TX (US)

(73) Assignee: SUMNER MANUFACTURING COMPANY, LLC, Houston, TX (US)

( * ) Notice: Subject to any disclaimer, the term of this patent is extended or adjusted under 35 U.S.C. 154(b) by 352 days.

(21) Appl. No.: 15/360,056

(22) Filed: Nov. 23, 2016

(65) Prior Publication Data
US 2018/0141169 A1    May 24, 2018

(51) Int. Cl.
| | |
|---|---|
| B25H 1/16 | (2006.01) |
| F16M 11/24 | (2006.01) |
| F16M 11/26 | (2006.01) |
| B25H 1/06 | (2006.01) |
| F16L 55/18 | (2006.01) |
| F16B 2/20 | (2006.01) |
| F16B 2/24 | (2006.01) |
| B25H 1/10 | (2006.01) |
| B23K 37/053 | (2006.01) |
| B21D 43/00 | (2006.01) |

(Continued)

(52) U.S. Cl.
CPC ........ *B23K 37/0538* (2013.01); *B21D 43/003* (2013.01); *B23Q 3/18* (2013.01); *B25H 1/06* (2013.01); *B25H 1/10* (2013.01); *B25H 1/16* (2013.01); *F16B 2/246* (2013.01); *F16L 55/18* (2013.01); *F16M 11/245* (2013.01); *F16M 11/26* (2013.01); *B23K 2101/06* (2018.08); *F16M 2200/027* (2013.01)

(58) Field of Classification Search
CPC .......... B25H 1/0035; B25H 1/16; F16B 2/246
See application file for complete search history.

(56) References Cited

U.S. PATENT DOCUMENTS 1,845,143 A * 2/1932 Friesner .................. E04H 15/60
                                                          135/114
2,051,969 A * 8/1936 Shastock ................. F16B 2/246
                                                          135/909

(Continued)

FOREIGN PATENT DOCUMENTS

GB         1230843 A * 5/1971  .............. F16B 2/246

*Primary Examiner* — Tyrone V Hall, Jr.
(74) *Attorney, Agent, or Firm* — Egbert Law Offices, PLLC (57) ABSTRACT

An adjustable roll and support mechanism for elongate objects having a round cross-sectional configuration has a support base having a pair of parallel upright tubular members having rigid or collapsible support legs. Elevation posts are positioned in movable telescoping relation within respective tubular members and support a roll positioning head having an internal roll positioning mechanism. A pair of roll assemblies are movably supported on the roll positioning head. Lock rings are positionable at a locking position to restrain downward movement of the elevation posts relative to the tubular members and are positionable at a release position permitting downward movement of the elevation posts. Lock ring stops are mounted to a transverse structural member and are positioned to prevent the lock rings from becoming bound after being struck by a lock release mechanism.

19 Claims, 6 Drawing Sheets (51) Int. Cl.
*B23Q 3/18* (2006.01)
*B23K 101/06* (2006.01)

(56) References Cited

U.S. PATENT DOCUMENTS

| | | | | |
|---|---|---|---|---|
| 3,363,291 A | * | 1/1968 | Bond | F16B 2/246 |
| | | | | 292/306 |
| 3,588,023 A | | 6/1971 | Cohen | |
| 4,979,490 A | * | 12/1990 | Nudo | A47J 33/00 |
| | | | | 126/25 A |
| 5,108,066 A | * | 4/1992 | Lundstrom | A63B 21/0728 |
| | | | | 24/524 |
| 5,297,779 A | * | 3/1994 | Collins, Jr. | B66F 3/08 |
| | | | | 254/98 |
| 5,337,875 A | * | 8/1994 | Lee | B65G 13/12 |
| | | | | 193/35 C |
| 5,934,626 A | * | 8/1999 | Collins, Jr. | B23K 37/0538 |
| | | | | 248/132 |
| 7,207,555 B2 | * | 4/2007 | Valentin | B21C 37/06 |
| | | | | 248/132 |
| 8,646,731 B2 | * | 2/2014 | Burles | F16L 3/16 |
| | | | | 144/287 |
| 9,545,704 B2 | * | 1/2017 | Guillot | B25B 1/20 |

* cited by examiner

ADJUSTABLE PIPE ROLL AND SUPPORT MECHANISM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

This invention relates generally to pipe jacks and supports such as are typically utilized for support of pipe and other elongate members in horizontally oriented manner to facilitate welding and other operations. More particularly the present invention concerns a support mechanism having a support base structure that may be collapsible for ease of storage and handling and which is provided with quick-disconnect type removable support roll assemblies that have lateral spacing adjustment to accommodate pipes and other round objects of differing dimension and incorporate a brake to enable selective rotary positioning of a work-piece rotatably supported thereby. This invention also concerns pipe roll and support mechanisms having height adjustment to provide for selective elevation and rotatable support of loads and having a locking mechanism to ensure against inadvertent downward movement of the roll assemblies and the load supported thereby.

2. Description of Related Art Including Information Disclosed Under 37 CFR 1.97 and 37 CFR 1.98

The term "pipe roll" as used herein is intended to mean support devices having roll assemblies to provide rotatable support for pipes, poles and any other object having a cylindrical outer peripheral surface and which is intended to be rotatably supported generally horizontally to enable various work to be performed on it. Various types of devices for rotatable support of pipe and various other elongate objects of round cross-sectional configuration have been developed. These support devices, typically referred to as pipe rolls and supports, generally comprise a support structure having legs and further having a roll support member at the upper portion on which is mounted a pair of rollers that provide rotatable support for the pipe or other object being supported. In some cases the roll assemblies of the support device are selectively positionable to enable the support device for efficient support of round objects of differing dimension.

Though pipe rolls are quite advantageous to the construction industry and commercial servicing industry to enable round objects to be efficiently positioned for the performance of work thereon, when pipe rolls are not being used they represent impediments in the work environment because they are difficult and inconvenient to store. Moreover, when pipe rolls are being transported or stored, they typically require considerable space because of their typically fixed geometry. It is considered desirable to provide pipe rolls that are collapsible so that, when they are not needed for rotatable support of work-pieces, they can be easily stored without requiring an unusually large storage facility. Also, pipe rolls that are collapsible can be more efficiently handled and shipped.

Many pipe rolls have selective incremental height adjustment by providing locking pins or bolts that are received within registering apertures in load elevating components. It is desirable to provide for selective height adjustment of rotatably supported loads wherein the pipe roll mechanism is quickly and efficiently adjustable to any selected elevation between maximum and minimum limits.

In many cases the load being rotatably supported by a pipe roll requires roll assemblies that are composed of a material that will not damage the cylindrical outer surface of the load. When specific roller material is required (rubber or polymer rollers for example) for rotatably supporting particular objects it is typically necessary to partially disassemble the pipe roll and replace the rollers of the roll assemblies. This is a time consuming and expensive process not only from the standpoint of labor, but also because of the rollers and other materials that are replaced and are often lost or misplaced so that they are not again usable. If the roll assemblies of pipe rolls are of adjustable to accommodate loads of differing dimension it is even more difficult and impractical to replace the rollers to accommodate rotatable support of particular objects. For these reasons, to provide for efficient support of differing work-pieces, it is considered more practical, though considerably more expensive, to provide different pipe roll devices for support of specific objects. It is desirable therefore to provide an adjustable pipe roll mechanism having roll assemblies that are simply and quickly interchangeable so that pipe rolls can be converted for efficient support of objects that require particular types of rollers to minimize the potential for marring or otherwise damaging the outer cylindrical surface of the object being engaged and supported by the rollers of a roll assembly.

Many types of pipe jacks are provided with friction type locking rings to facilitate a wide range of elevational adjustment between minimum and maximum work-piece elevations. In some cases, to achieve unlocking or release of lock rings, workers must release the load acting thereof and then manually manipulate the locking rings to the release positions thereof before the load is lowered. If the locking rings should slip for any reason or if the pipe jack should fall, there is potential for injury to the hands of the worker. U.S. Pat. Nos. 3,588,023 and 5,297,779 each provide apparatus that ensure protection for the hands and fingers of workers when the lock rings of pipe jacks are released. It is desirable therefore to provide pipe roll mechanisms with a lock ring unlocking system that ensures that the hands of the workers are always located away from the locking ring or rings as the lock rings are being moved to the unlocking or release positions thereof.

In response to the difficulties discussed hereinabove, the inventor and applicant developed a product, the subject of U.S. Pat. No. 5,934,626 (the '626 patent). The '626 patent discloses an adjustable an adjustable pipe roll and support mechanism having a pair of generally parallel, generally vertically oriented tubular elements that are structurally interconnected to define components of a support base. The support base may be provided with fixed support legs or, to facilitate efficient handling, storage and transportation, may be provided with collapsible support legs, there being two angularly oriented support legs for each of the tubular elements. A support frame having a roll support head and generally parallel elevation posts is disposed in elevating assembly with the support base. The elevation posts are telescopically received within respective tubular elements and are vertically adjustable by friction lock ring assemblies. A lock release mechanism is provided for the pipe roll mechanism which permits workers to release the friction locking rings without necessitating positioning the hands or fingers of workers at locations where injuries might occur if the elevation posts should be released and suddenly fall. The elevation posts are fixed to the end portions of a support head on which is mounted a pair of roll assemblies having adjustable spacing for support of objects of differing dimension. The roll assemblies are provided with a quick-release connection with the roll positioning mechanism of the support structure to thus enable the roll assemblies to be quickly and efficiently changed out as desired for efficient protective rotatable support of particular objects.

However, it was found that after being struck by elevation lock actuators of the lock release mechanism, the locking rings can become stuck in a position beyond horizontal relative to the cylindrical elevation post members. This leads to possible safety and practical issues associated with use of the product. For example, this over-opening of the locking rings could potentially cause damage to the elevation post members. In the event of damage, the owner of the device would have to replace the elevation post members. Further, it is possible that the locking rings can bend, thus causing difficulties in use of the support mechanism, in that it becomes difficult or impossible to maintain horizontal orientation of the locking rings. Any damage to the locking rings or elevation post members interferes with the normal operation of the apparatus. These problems can become exasperated by the use of the product in environments where dust and dirt are common. Resetting the over-opened locking rings can be problematic considering the positioning of heavy pipe on the top of the support mechanism.

As such, it is an object of the present invention to provide an adjustable roll and support mechanism wherein the locking rings are prevented from becoming stuck after being struck by elevation lock actuators of the lock release mechanism.

These and other objects and advantages of the present invention will become apparent from a reading of the attached specification and appended claims.

BRIEF SUMMARY OF THE INVENTION

The present invention is an adjustable roll and support mechanism for rotatable support of elongate objects having a round cross-sectional configuration, comprising: a support base having a pair of tubular members being disposed in generally parallel and spaced relation, and a transverse structural member defining ends being fixed to the tubular members and maintaining upper ends of the tubular members in fixed and spaced relation to one another; support leg members projecting downwardly from respective tubular members and being oriented in angular relation with respective tubular members; a pair of elevation posts having lower portions thereof received in telescoping relation within respective tubular members; a roll positioning head being fixed to the elevation posts and having a roll positioning mechanism; a pair of roll assemblies having driven connection with the roll positioning mechanism and being disposed in force transmitting relation with the roll positioning head, the roll assemblies each having a work engaging roller disposed for rotatable supporting engagement with an elongate object of round cross-section; lock ring assemblies being mounted to the tubular elements of the support base and having lock rings being disposed about the elevation posts, the lock rings being positionable at a locking position to restrain downward movement of the elevation posts relative to the tubular members and being positionable at a release position permitting downward movement of the elevation posts relative to the tubular members; and lock ring stops being mounted to the transverse structural member, each of the lock ring stops having a portion positioned above the respective lock ring.

In an embodiment of the present invention, each of the lock ring stops include a lower portion welded to the transverse structural member, and an upper portion positioned above a respective lock ring of the lock rings, the upper portion positioned so as to restrain upward movement of the respective lock ring relative to the tubular members. Preferably, the lower portion of the lock ring stops extends generally vertically upwardly of the transverse structural member, and the upper portion of the lock ring stops extends generally horizontally outwardly from the lower portion.

In an embodiment of the present invention, an elevation lock actuator is movably supported by the transverse structural member and movable to a position engaging the lock rings and moving the lock rings to the release positions thereof. The lock ring stops prevent the lock rings from moving beyond a generally horizontal position after being engaged by the elevation lock actuator.

The present invention is also an adjustable roll and support mechanism for rotatable support of elongate objects having a round cross-sectional configuration, comprising: a support base having a pair of tubular members being disposed in generally parallel and spaced relation, and a transverse structural member defining ends being fixed to the tubular members and maintaining upper ends of the tubular members in fixed and spaced relation to one another; support leg members projecting downwardly from respective tubular members and being oriented in angular relation with respective tubular members; a pair of elevation posts having lower portions thereof received in telescoping relation within respective tubular members; an elongate roll positioning head having end portions being fixed to the elevation posts, the roll positioning head defining an upwardly facing longitudinal slot; a roll positioning shaft being rotatably supported by the elongate roll positioning head and having threaded sections having threads of opposite pitch from one another; a pair of follower assemblies having threaded connection with respective threaded sections of the roll positioning shaft, each of the follower assemblies having at least one roll connector projecting through the upwardly facing longitudinal slot; a pair of roll assemblies having releasable driven connection with a respective roll connector and being disposed in force transmitting relation with the roll positioning head, the roll assemblies each having a work engaging roller disposed for rotatable supporting engagement with an elongate object of round cross-section; lock ring assemblies being mounted to the tubular elements of the support base and having lock rings being disposed about the elevation posts, the lock rings being positionable at a locking position to restrain downward movement of the elevation posts relative to the tubular members and being positionable at a release position permitting downward movement of the elevation posts relative to the tubular members; an elevation lock actuator being movably supported by the transverse structural member and being movable to a position engaging the lock rings and moving the lock rings to the release positions thereof; and lock ring stops being mounted to the transverse structural member, each of the lock ring stops having a portion positioned above the respective lock ring of the lock ring assemblies.

In an embodiment of the present invention, each of the lock ring stops includes a lower portion welded to the transverse structural member, and an upper portion positioned above a respective lock ring of the lock rings, the upper portion positioned so as to restrain upward movement of the respective lock ring relative to the tubular members. Preferably, the lower portion of the lock ring stops extend generally vertically upwardly of the transverse structural member, and the upper portion of the lock ring stops extend generally horizontally outwardly from the lower portion. The lock ring stops are positioned to prevent the lock rings from moving beyond a generally horizontal position after being engaged by the elevation lock actuator.

This foregoing Section is intended to describe, in generality, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
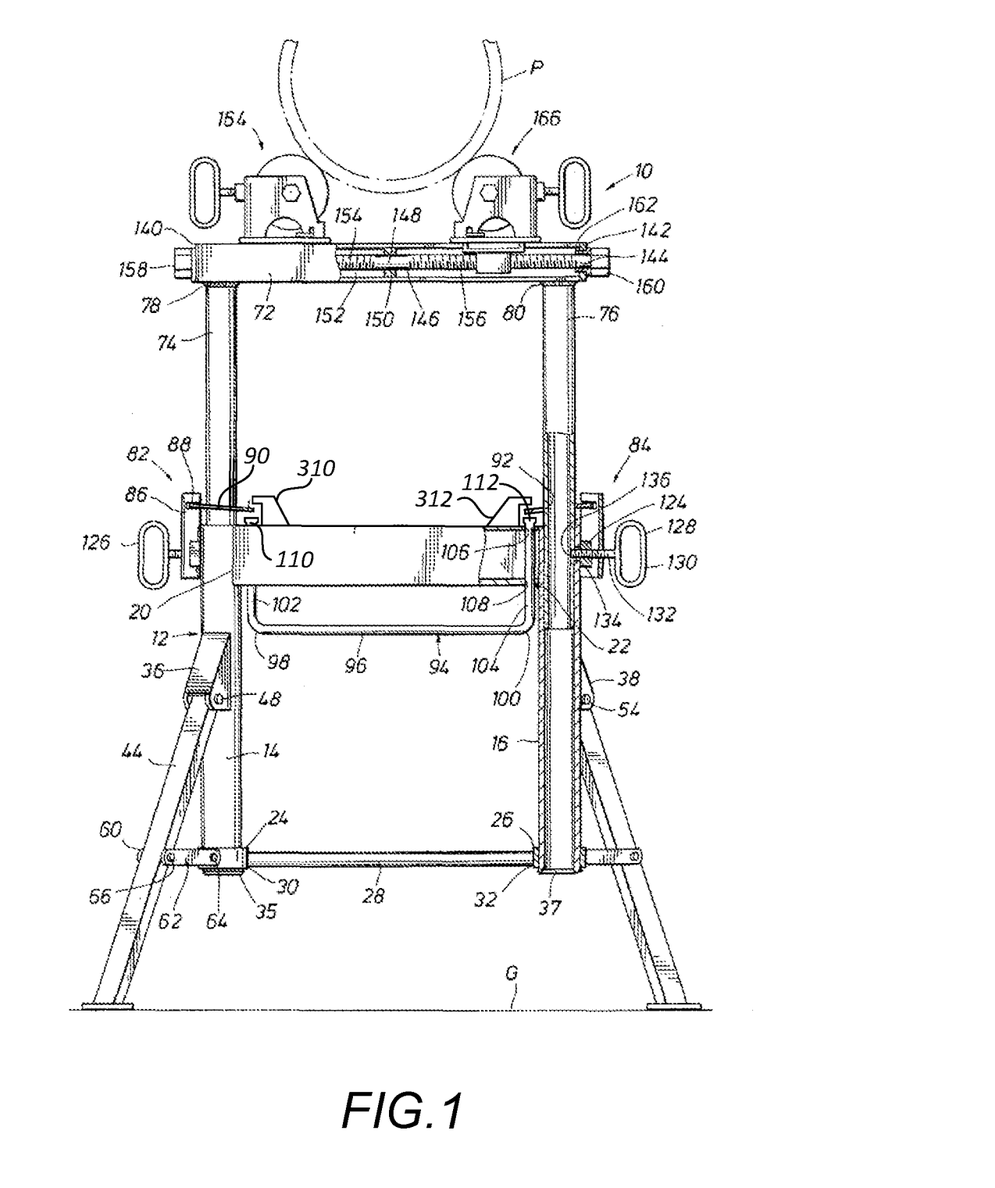
FIG. 1 is an elevational view of an adjustable pipe roll and support mechanism constructed in accordance with the present invention and showing a preferred embodiment of the invention, with parts thereof broken away and shown in section.

Referring now to the drawings and first to FIG. 1, an adjustable pipe roll and support mechanism constructed in accordance with the present invention is illustrated generally at 10 and comprises a base structure shown generally at 12. The base structure is defined by a pair of vertically oriented, generally parallel tubular members 14 and 16 that are interconnected at the upper end portions thereof by a transverse structural member 18 having its ends 20 and 22 respectively fixed by welding or by any other suitable means of connection to the respective tubular members 14 and 16. At the lower ends of the tubular members a pair stabilizer rings 24 and 26 are moveably disposed about the tubular members and are interconnected by a generally horizontally oriented stabilizer bar 28 having the respective ends 30 and 32 thereof fixed to the respective stabilizer rings by welding or by any other suitable means of rigid connection. The bottom ends 35 and 37 of the tubular members are belled as shown or are otherwise formed to define stop shoulders that retain the respective stabilizer rings in assembly about the tubular members. Thus, the stabilizer rings 24 and 26 can move upwardly from the position shown in FIG. 1, but are prevented from moving downwardly by the down-stop shoulders 35 and 37 that are defined by the belled lower ends of the tubular members.

Figure 2:
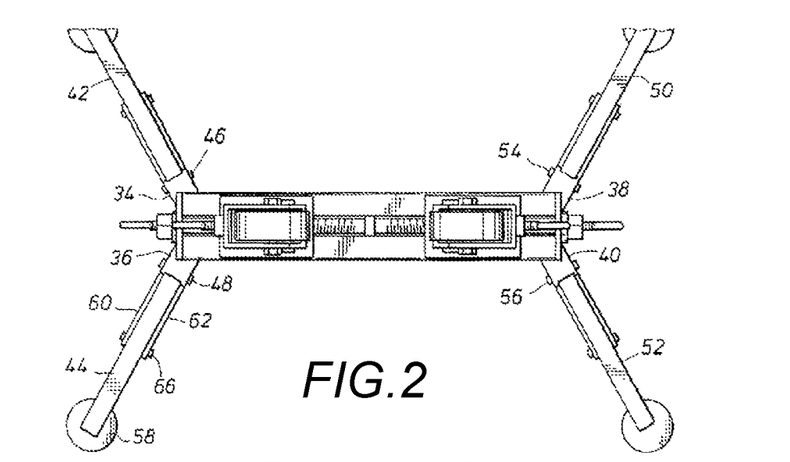
FIG. 2 is a plan view of the adjustable pipe roll and support mechanism of FIG. 1 showing the fully extended condition of the collapsible legs thereof.
Figure 3:
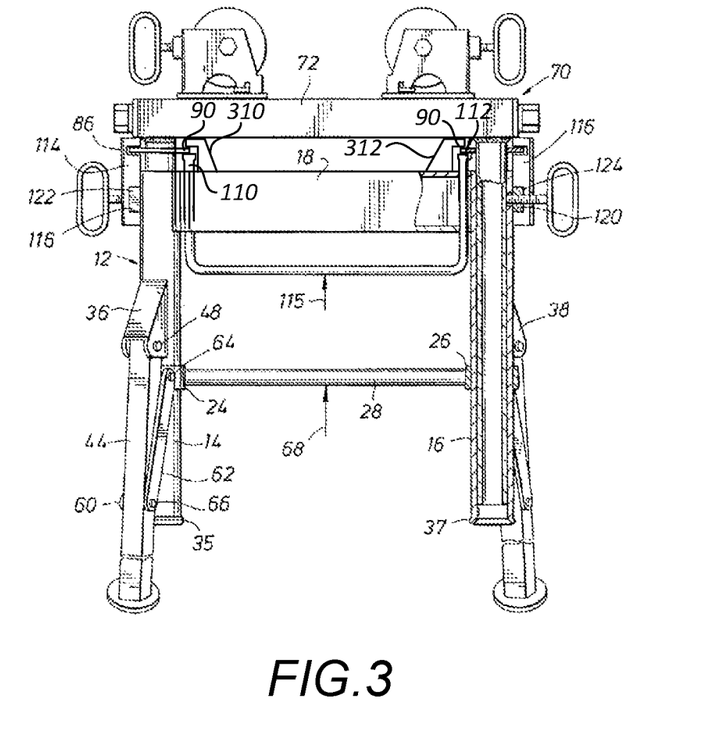
FIG. 3 is an elevational view of the adjustable pipe roll and support mechanism of FIGS. 1 and 2, showing the fully collapsed condition of the collapsible legs thereof and showing the elevation control lock rings thereof in their release positions.
Figure 4:
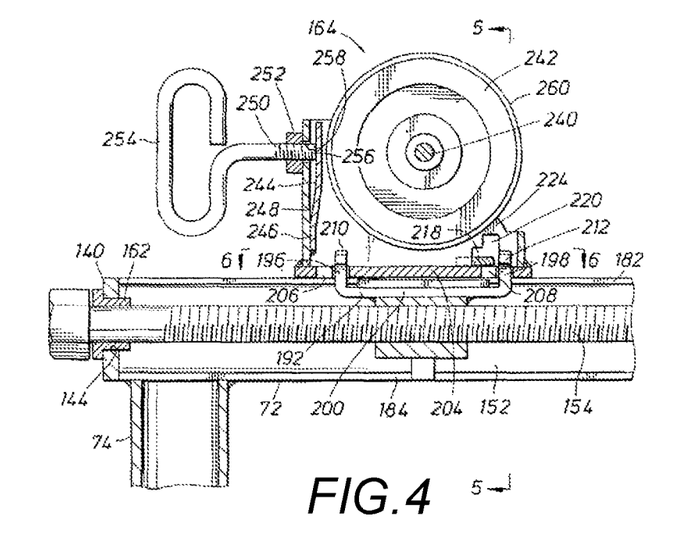
FIG. 4 is a partial sectional view showing a portion of the support frame structure of FIGS. 1-3 and showing a roll assembly in operative relation with the roll positioning mechanism and with the roll brake in its release position.
Figure 5:
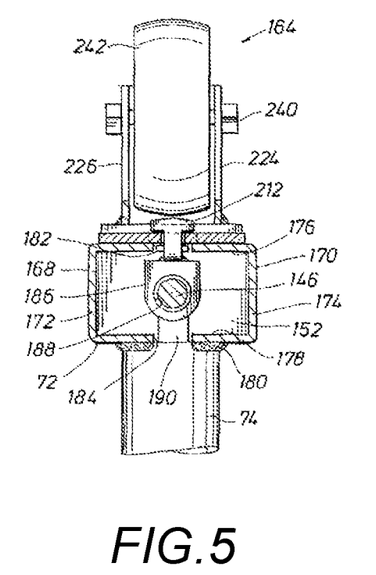
FIG. 5 is a sectional view taken along line 5-5 of FIG. 4.
Figure 6:
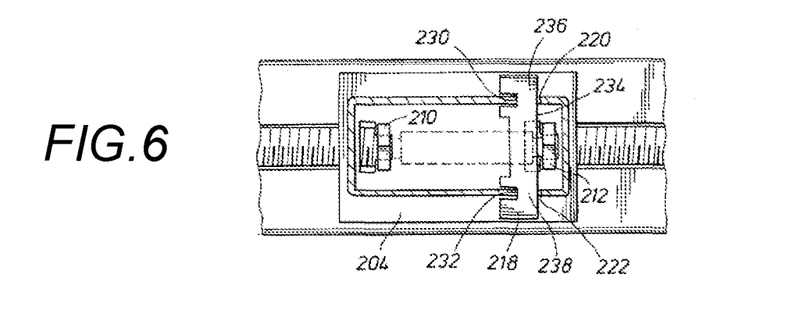
FIG. 6 is a sectional view taken along line 6-6 of FIG. 4 and showing the roll assembly mechanism there disposed in its locked and operative condition.
Figure 7:
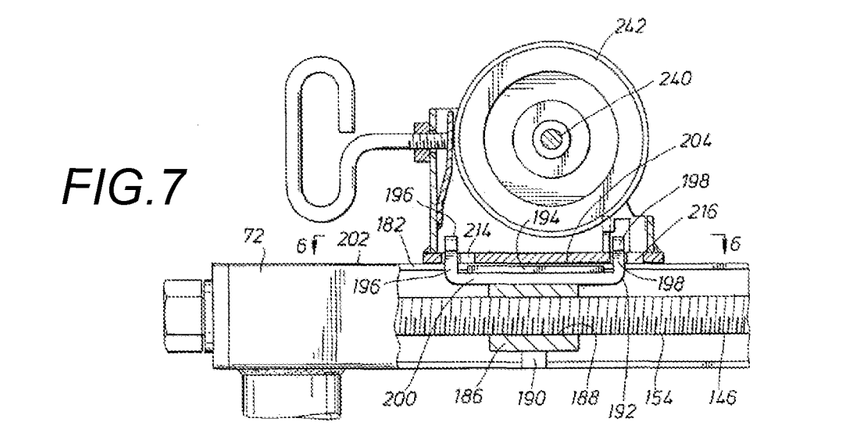
FIG. 7 is a partial elevational view of the support frame structure having parts thereof broken away and shown in section and presenting the roll assembly mechanism with the latch mechanism in its latched condition and with the roll brake in its braking position.
Figure 8:
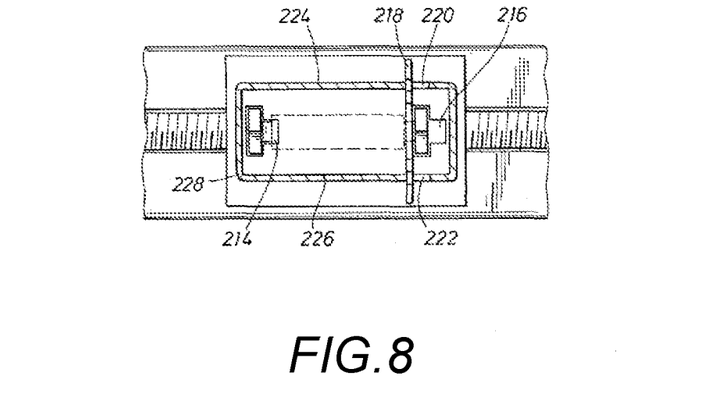
FIG. 8 is a sectional view taken along line 8-8 of FIG. 7.
Figure 9:
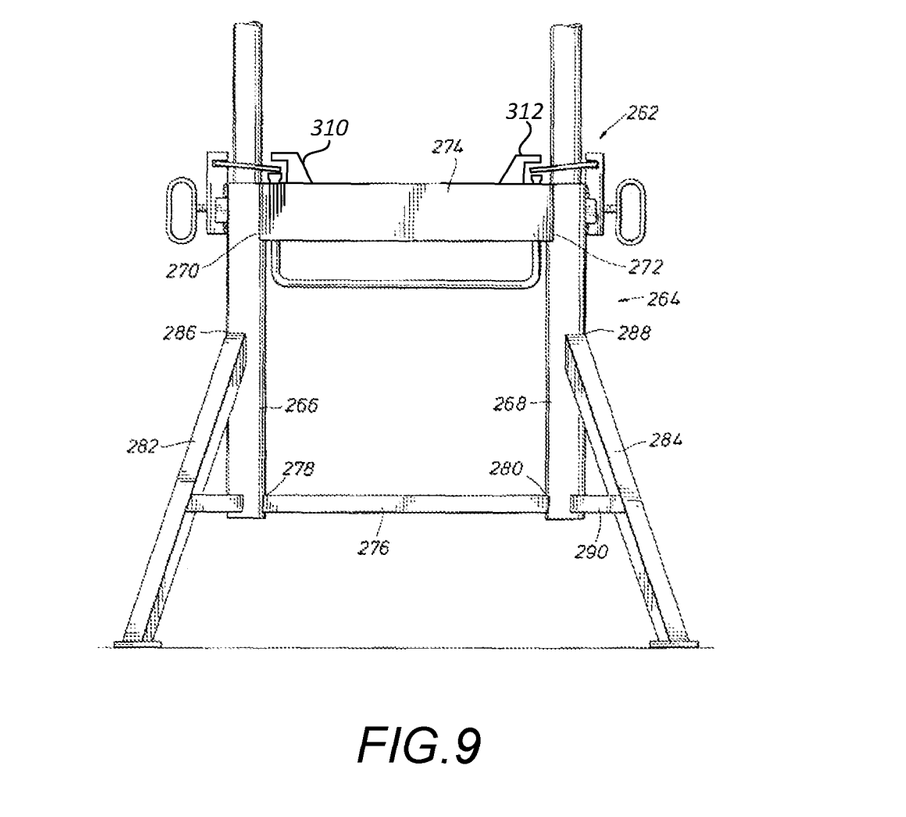
FIG. 9 is a partial elevational view of an alternative embodiment of the present invention wherein the base structure is provided with fixed legs and provides elevating support for the support frame and is provided with adjustable and releasable roll assemblies in the same manner as set forth in FIGS. 1-8.

It should be borne in mind that the base structure may have collapsible legs as shown FIGS. 1-3 so as to enable the adjustable pipe roll and support mechanism to be collapsed for ease of efficient storage and handling or to be extended as shown in FIGS. 1 and 2 to facilitate stabilized rotatable support of an object ofround cross-sectional configuration, such as the pipe partially shown in broken line at "P". In the alternative, the base structure 12 may be provided with fixed support legs as shown in FIG. 9 hereof and discussed in detail hereinbelow.

Referring now again to FIGS. 1-3 the collapsible leg embodiment of the present invention incorporates a pair of generally triangular leg mounts 34 and 36 which are fixed by welding to the tubular member 14 and are deposed in angularly offset relation with one another as is evident from FIG. 2. Likewise, a pair of leg mounts 38 and 40 are similarly fixed to the tubular member 16 as shown in FIGS. 1-3 and are positioned in angularly offset relation with one another. Base support legs 42 and 44 are moveably connected at the upper ends thereof to respective pivot mounts 34 and 36 by means of pivot connectors 46 and 48. To the leg mounts 38 and 40 are pivotally connected a pair of support legs 50 and 52 having the upper ends thereof secured to the leg mounts by pivot connectors 54 and 56. The lower end of each of the collapsible legs is provided with a foot member such is shown at 58 which is welded or otherwise fixed to the lower end of the respective support leg. Each foot member may be of circular configuration as is evident from FIGS. 2 and 3 but may have any other suitable configuration without departing from the spirit and scope of this invention.

For positioning support and stabilization of each of the collapsible legs of the base structure 12 a pair of connector links are provided for each leg as shown at 60 and 62. These connector links are connected by pivots 64 to the stabilizer ring 24 and are connected by pivots 66 at pivot points located intermediate the respective ends of the collapsible support legs. The respective pivots 64 and 66 may conveniently take the form of rivet pins or bolt and nut assemblies which extend through aligned apertures of the respective collapsible support legs and function to secure both of the connector links for each leg in pivotal assembles with the leg structure. Likewise, at the opposite ends of each of the connector links 62 the pivots 64 extend through apertures of the connector links and also extend through connection apertures of external bosses that are fixed to or defined by the respective stabilizer rings. Consequently, as the collapsible legs 44 are moved form the extended positions thereof shown in FIG. 1 toward the collapsed position shown in FIG. 3, the stabilizer rings and stabilizer bar 28 will move upwardly, the stabilizer rings 24 sliding along the length of the tubular members 14 and 16 to the fully collapsed positions of the support legs as shown in FIG. 3. Thus, collapsing movement of the support leg assembly of the base structure 12 is achieved by application of upward force on the stabilizer bar 28 as shown by the force arrow 68. Conversely, in order to achieve movement of the collapsible support legs 44 from the collapsed position toward the fully extended position shown in FIG. 1, a downward force is applied to the stabilizer bar 28 thus moving the stabilizer rings 24 and 26 downwardly along the outer surface of the tubular members until the circular down stops 35 and 37 are engaged by the stabilizer rings.

To the collapsible base structure 12 there is provided a work-piece support frame shown generally at 70 which is disposed in vertically moveable assembly with the base structure and is selectively positioned from the standpoint of elevation to position a work-piece at a selected height. The support frame 70 comprises a generally horizontally oriented support member or head 72 which is of a configuration defining an internal chamber or passage. At respective ends of the support head 72 a pair of cylindrical elevation post members 74 and 76 are fixed such as by welds 78 and 80. The cylindrical elevation post members 74 and 76 define support members that are vertically positionable relative to the base structure for the purpose of positioning the pipe "P" or other object at a desired height above the ground or floor surface "G". The cylindrical elevation post members 74 and 76 are positioned in telescoping relation within the tubular members 14 and 16 and are thus stabilized by the base structure 12. For securing the cylindrical elevation post members at selected positions relative to the base structure with sufficient retention force to support the load of the pipe "P" and the weight of the support frame a pair of locking assemblies shown generally at 82 and 84 are provided at the upper end portion of the base structure. These locking assemblies are each defined by lock control members 86 that are fixed by welding to the respective upper ends of the tubular members 14 and 16. The lock control members define lock ring control slots 88 within which is located a peripheral portion of a friction type lock ring 90 that is moveably positioned about the respective cylindrical elevation post members 34 and 76. The lock rings 90 define a central opening 92 of a dimension, relative to the external dimension of the respective inner tubular member, so that, with the lock ring positioned in normal relation with the respective elevation post member, relative linear movement is permitted between the lock ring and the elevation post member, thus allowing the elevation posts to be moved upwardly or downwardly relative to the tubular elements. When the lock ring becomes disposed in angular relation with the respective cylindrical elevation post member as shown in FIG. 1 a frictional binding of the lock ring to the respective cylindrical elevation post member occurs which prevents downward linear movement of the cylindrical elevation post member and lock ring. This frictional locking or binding retention occurs as downward force of the support frame, caused by the weight of the support frame and the weight of any load being applied thereto, is transferred downwardly from the support head through the cylindrical elevation post members 74 and 76. Since a peripheral portion of each of the lock rings is retained within the respective locking control slot 88 at only one side portion of each lock ring, the lock ring will naturally assume an angular, locking position as shown in FIG. 1 so that the downward load on the cylindrical elevation post members will be resisted by the frictional binding activity of the lock rings. When upward force is applied to the support frame for raising the support frame to a desired elevation relative to the base structure, the lock rings 90 will be moved slightly toward a normal position relative to the elevation posts, releasing frictional binding with the elevation posts and allowing the support frame to be easily raised. As soon as this frame raising force is dissipating however, and a downward force is applied to the cylindrical elevation post members, even as little downward force as that caused by the weight of the support frame, the lock rings 90 will immediately bind to the cylindrical elevation post members and will thus restrain the elevation posts and thus the support frame against further downward movement. The locking control elements restrain one side of each lock ring so that elevation post movement causes locking and unlocking movement of the lock rings.

In the event the lock rings 90 should become bound to the elevation post members and it is desired to lower the support frame, the lock rings can be actuated to the release positions thereof shown in FIG. 3 by a lock ring actuator shown generally at 94. The lock ring actuator defines a generally horizontally orientated actuator rod 96 which is bent at 98 and 100 to define generally parallel actuator rod sections 102 and 104 that extend through upper and lower registering apertures 106 and 108 at each side of the transverse structural element 18. These actuator rod sections define enlarged heads 110 and 112 respectively that secure the lock ring actuator in vertically movable assembly with the transverse structural element 18. The length of the actuator rod sections 102 and 104, as compared with the vertical width of the transverse structural element 18, thus permits the lock ring actuator 94 to be moved upwardly from the position shown in FIG. 1 to a lock ring release position shown in FIG. 3, as evidenced by the movement arrow 115 where the enlarged heads 110 and 112 of the actuator rod sections are positioned to engage and orient the respective lock rings 90 in normal relation with the cylindrical elevation post members to thus release frictional or binding engagement of the lock rings with the elevation posts and permit the support frame 70 to be either raised or lowered as desired relative to the base structure 12.

Each of the lock control elements 86 defines parallel side panels such as shown at 114 and 116, which side panels are disposed in substantially parallel, spaced relation. Each of the side panels defines retainer openings such as shown 118 and 120 within which are captured lock nut members 122 and 124 respectively. Lock actuators 126 and 128 are provided, each having an actuating handle 130 with an externally threaded lock pin 132 projecting from the handle and being of sufficient length to be received by the internal threads of the respective lock nut 122 or 124. The inner end of the lock pin 132 extends through an opening 134 defined by each tubular member and projects into a lock opening 136 of the respective cylindrical elevation post member. The cylindrical elevation post members may be provided with a number of spaced lock openings such is shown at 136 to thus enable positive locking of the elevation posts and tubular members against relative linear movement. It should be borne in mind that the inner end of the threaded lock pin may simply establish positive locking engagement with the respective cylindrical elevation post member by applying sufficient locking force to the actuating handles 130 of the lock actuators 128. The lock nuts 122 and 124 can be retained loosely within the respective openings 118 and 120, it only being necessary that the lock nuts be prevented from rotation by the lock control member. Thus the lock nuts are simply entrapped within their respective receptacles and, upon removal of the lock pins 132 from threaded engagement therewith, the lock nuts may be simply removed laterally from the respective lock nut receptacles if replacement of thereof is desired.

FIGS. 1-3 also shows the lock ring stops 310 and 312 of the preferred embodiment of the present invention. The lock ring stops 310 and 312 are preferably in the form of hooks which are welded to the transverse structural elements 18. These lock ring stops 310 and 312 prevent the locking rings 90 and 92 from moving past the horizontal relative to the elevation post members 74 and 76, when the locking rings 90 and 92 are struck by the heads 110 and 112 of the actuator rod sections or by other objects. By providing the lock ring stops 310 and 312, there is no longer a need to manually push the locking rings 90 and 92 back to the normal position, which may be dangerous when using heavy pipe. Unexpectedly, this minimal structural improvement is very beneficial and solves the binding problem associated with the use of such locking rings 90 and 92. Preferably, the bottom surface of the overlying portion of the lock ring stops 310 and 312 is aligned with the locking control slot such that the ring cannot move substantially beyond horizontal and become bound when struck by the heads 110 and 112 of the actuator rod sections.

Figure 10:
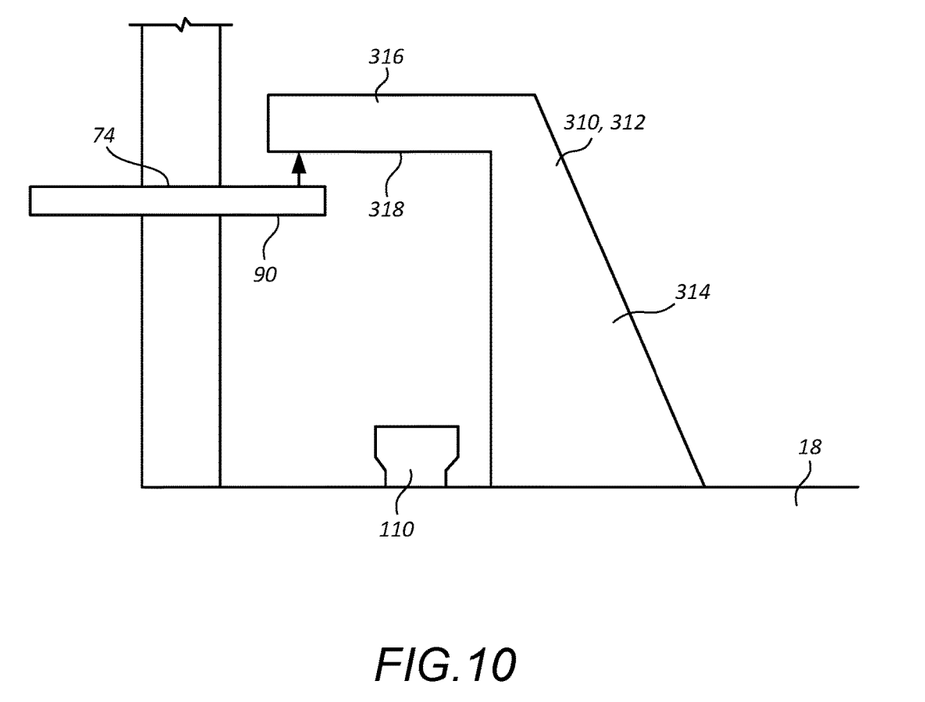
FIG. 10 shows an isolated view of the lock ring stops of the preferred embodiment of the present invention.

FIG. 10 shows an isolated view of lock ring stops 310 and 312. FIG. 10 illustrates how the lock ring stops 310 and 312 each comprise a generally vertical portion 314 which is welded to the transverse structural member 18. The vertical portion 314 is connected to horizontal portion 316. The horizontal portion 316 of the lock ring stops 310 and 312 overlies the lock ring 90 shown in FIG. 10. It can be seen how the underside 318 of the horizontal portion 316 of the lock ring stops 310 and 312 is positioned just above the top surface of the lock ring 90 when the lock ring 90 is in a generally horizontal position. When the lock ring 90 is struck by the actuator rod head section 110 from below, the underside 318 of the lock ring stops 310 and 312 prevent the lock ring 90 from moving beyond a horizontal position, which can result in a stuck situation wherein the locking ring is bound and must be manually pushed down to the horizontal position relative to the cylindrical elevation post member 74.

Over-opening and binding of the locking rings after release is not an obvious problem. However during use of the apparatus of the '626 patent, it became apparent that it was extremely important to maintain horizontal orientation of the locking ring, particularly with the use of heavy pipe. Rather unexpectedly, this relatively minimal structural change has provided greater usability and reliability of the apparatus, by both decreasing the likelihood of damage to the assembly and subsequent replacement of parts, and also by avoiding the situation wherein the locking we would have to be manually push downward.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An adjustable roll and support mechanism for rotatable support of elongate objects having a round cross-sectional configuration, comprising:
    a support base having a pair of tubular members being disposed in generally parallel and spaced relation, and a transverse structural member defining ends being fixed to said tubular members and maintaining upper ends of said tubular members in fixed and spaced relation to one another;
    support leg members projecting downwardly from respective tubular members and being oriented in angular relation with respective tubular members;
    a pair of elevation posts having lower portions thereof-received in telescoping relation within respective tubular members;
    a roll positioning head being fixed to said elevation posts and having a roll positioning mechanism;
    a pair of roll assemblies having driven connection with said roll positioning mechanism and being disposed in force transmitting relation with said roll positioning head, said roll assemblies each having a work engaging roller disposed for rotatable supporting engagement with an elongate object of round cross-section;
    a pair of lock ring assemblies respectively mounted to said pair of tubular members, each of said pair of lock ring assemblies comprising:
        a lock control member fixed to an upper end of the tubular member, said lock control member having a lock ring control slot formed therein; and
        a lock ring having a peripheral portion thereof received in the lock ring control slot, said lock ring having a central opening through which the elevation post extends, the lock ring pivoting in one direction within the lock ring control slot to a locking position that restrains downward movement of the elevation post relative to the tubular member, the lock ring pivoting in another direction in the lock ring control slot to a release position so as to permit downward movement of the elevation post relative to the tubular member; and
    lock ring stops being mounted to said transverse structural member, each of said lock ring stops having a portion positioned above the respective lock ring, a bottom surface of the portion of the lock ring stops being aligned with the lock ring control slot.

2. The adjustable roll and support mechanism of claim 1, each of said lock ring stops comprising:
    a lower portion welded to said transverse structural member; and
    an upper portion positioned above a respective lock ring of said lock rings, said upper portion positioned so as to restrain upward movement of said respective lock ring relative to said tubular members.

3. The adjustable roll and support mechanism of claim 2, said lower portion of said lock ring stops extending generally vertically upwardly of said transverse structural member, said upper portion of said lock ring stops extending generally horizontally outwardly from said lower portion.

4. The adjustable roll and support mechanism of claim 1, wherein:
said roll assemblies each being in releasable assembly with said roll positioning mechanism and having a manually operable brake for rotatably positioning an object rotatably supported thereby.

5. The adjustable roll and support mechanism of claim 1, wherein said roll positioning mechanism comprises:
a pair of shaft followers each having guided relation with said roll positioning head;
a roll positioning shaft being rotatably supported by said roll positioning head and having driving connection with said shaft followers for moving said shaft followers toward one another or away from one another depending upon the direction of shaft rotation, said roll adjustment shaft having a drive portion being positioned for manual actuation to achieve roll positioning rotation of said roll positioning shaft.

6. The adjustable roll and support mechanism of claim 5, wherein:
said roll positioning shaft having spaced threaded sections of opposing pitch; and
said shaft followers each having an internally threaded driven members having threaded engagement respectively with one of said spaced threaded sections of said roll positioning shaft.

7. The adjustable roll and support mechanism of claim 6, wherein each of said shaft followers comprise:
a follower body defining an internally threaded bore being disposed in threaded engagement with a respective one of said threaded sections of said roll adjustment shaft;
a roll connector element being fixed to said follower body and defining at least one connector projection; and
a quick release locking mechanism releasably securing said connector projection in driving connection with a respective one of said roll assemblies.

8. The adjustable roll and support mechanism of claim 6, wherein said quick release locking mechanism comprises:
said roll assemblies each having a base member disposed in movable load transferring relation with said roll positioning head, said base member defining at least one latch connector opening;
said connector projection being received in mechanically interlocked relation within said latch connector opening; and
a latch key being disposed in movable assembly with said roll assembly and being movable from a latched position preventing movement of said connector projection from said latch connector opening to an unlatched position allowing movement of said connector projection from said latch connector opening.

9. The adjustable roll and support mechanism of claim 1, wherein:
an elevation lock actuator is movably supported by said transverse structural member and being movable to a position engaging said lock rings and moving said lock rings to said release positions thereof.

10. The adjustable roll and support mechanism of claim 9, wherein: said lock ring stops prevent said lock rings from moving beyond a generally horizontal position after being engaged by said elevation lock actuator.

11. The adjustable roll and support mechanism of claim 1, wherein:
positive lock mechanisms being supported by said tubular members and having positive lock elements being movable to positions engaging respective elevation posts and locking said elevation posts against both upward and downward movement relative to said tubular members.

12. The adjustable roll and support mechanism of claim 11, wherein said positive lock mechanisms each comprises:
lock control elements being fixed to each of said tubular members and having side panels, said lock control elements defining a lock ring slot receiving a portion of a lock ring therein, said side panels defining lock nut apertures;
a lock nut being non-rotatably supported by each of said lock control elements; and
a lock pin being threadedly received by said lock nut and being driven linearly by said drive nut upon rotation of said lock pin for linear locking and unlocking movement thereof relative to said elevation posts.

13. The adjustable roll and support mechanism of claim 1, wherein said support leg members comprise:
a pair of pivot mounts being fixed to each of said tubular members;
a support leg being pivotally connected to each of said pivot mounts and being pivotally movable from a collapsed position to an extended position;
a stabilizer ring member being movably positioned about each of said tubular members; and
connector links having ends being pivotally connected to said stabilizer ring member and to respective support legs, said connector links determining the positions of said support legs at said collapsed and extended positions thereof.

14. The adjustable roll and support mechanism of claim 13, wherein:
a stabilizer bar having ends thereof disposed in fixed relation with said stabilizer rings and ensuring substantially parallel positioning of said tubular members.

15. The adjustable roll and support mechanism of claim 1, wherein said support leg members comprise:
a pair of support legs being fixed to each of said tubular members, each of said support legs having upper and lower ends, said upper ends being fixed to said tubular members and said lower ends having foot pads for engaging a surface upon which said adjustable roll and support mechanism rests;
transverse brace members being fixed to said tubular elements and said support legs; and
a horizontal stabilizer bar having ends thereof fixed to respective tubular members and assisting in maintaining said tubular members in substantially parallel relation.

16. An adjustable roll and support mechanism for rotatable support of elongate objects having a round cross-sectional configuration, comprising:
a support base having a pair of tubular members being disposed in generally parallel and spaced relation, and a transverse structural member defining ends being fixed to said tubular members and maintaining upper ends of said tubular members in fixed and spaced relation to one another;
support leg members projecting downwardly from respective tubular members and being oriented in angular relation with respective tubular members;
a pair of elevation posts having lower portions thereof received in telescoping relation within respective tubular members;

an elongate roll positioning head having end portions being fixed to said elevation posts, said roll positioning head defining an upwardly facing longitudinal slot;

a roll positioning shaft being rotatably supported by said elongate roll positioning head and having threaded sections having threads of opposite pitch from one another;

a pair of follower assemblies having threaded connection with respective threaded sections of said roll positioning shaft, each of said follower assemblies having at least one roll connector projecting through said upwardly facing longitudinal slot; and a pair of roll assemblies having releasable driven connection with a respective roll connector and being disposed in force transmitting relation with said roll positioning head, said roll assemblies each having a work engaging roller disposed for rotatable supporting engagement with an elongate object of round cross-section;

a pair of lock ring assemblies respectively mounted to said pair of tubular members, each of said pair of lock ring assemblies comprising:

a lock control member fixed to an upper end of the tubular member, said lock control member having a lock ring control slot formed therein; and a lock ring having a peripheral portion thereof received in the lock ring control slot, said lock ring having a central opening through which the elevation post extends, the lock ring pivoting in one direction within the lock ring control slot to a locking position that restrains downward movement of the elevation post relative to the tubular member, the lock ring pivoting in another direction in the lock ring control slot to a release position so as to permit downward movement of the elevation post relative to the tubular member;

an elevation lock actuator being movably supported by said transverse structural member and being movable to a position engaging said lock rings and moving said lock rings to said release positions thereof; and lock ring stops being mounted to said transverse structural member, each of said lock ring stops having a portion positioned above the respective lock ring of said lock ring assemblies, a bottom surface of the portion of the lock ring stops being aligned with the lock ring control slot.

17. The adjustable roll and support mechanism of claim 16, each of said lock ring stops comprising:

a lower portion welded to said transverse structural member; and an upper portion positioned above a respective lock ring of said lock rings, said upper portion positioned so as to restrain upward movement of said respective lock ring relative to said tubular members.

18. The adjustable roll and support mechanism of claim 17, said lower portion of said lock ring stops extending generally vertically upwardly of said transverse structural member, said upper portion of said lock ring stops extending generally horizontally outwardly from said lower portion.

19. The adjustable roll and support mechanism of claim 16, said lock ring stops positioned to prevent said lock rings from moving beyond a generally horizontal position after being engaged by said elevation lock actuator.

* * * * *